United States Patent [19]
Eaton et al.

[11] 4,348,005
[45] Sep. 7, 1982

[54] VALVES FOR FLUIDS

[75] Inventors: Alan Eaton, Lymm; William T. Mitchell, Thirsk; Alec Sunderland, Weymouth, all of England

[73] Assignee: British Nuclear Fuels Limited, Cheshire, England

[21] Appl. No.: 293,663

[22] Filed: Sep. 28, 1972

[30] Foreign Application Priority Data

Oct. 1, 1971 [GB] United Kingdom ............... 45902/71

[51] Int. Cl.³ .............................................. F16C 31/44
[52] U.S. Cl. ................................. 251/268; 251/264; 251/335 B
[58] Field of Search ............ 251/268, 264, 331, 335 B

[56] References Cited

U.S. PATENT DOCUMENTS

| | | | |
|---|---|---|---|
| 1,992,902 | 2/1935 | McIntosh | 251/335 B |
| 2,444,703 | 7/1948 | Jones | 251/335 B |
| 2,495,081 | 1/1950 | Thomas | 251/335 B |
| 3,137,475 | 6/1964 | Schoenecker et al. | 251/268 |

Primary Examiner—Donald P. Walsh
Attorney, Agent, or Firm—Larson & Taylor

[57] ABSTRACT

A bellows-type valve includes several additional safeguards in the form of back-up seals which are effective to prevent in- or out-leakage should the bellows fail. Some of the seals can be changed while the valve remains closed. There is provision for testing the integrity of the seals while the valve remains operative.

2 Claims, 3 Drawing Figures

VALVES FOR FLUIDS

BACKGROUND OF THE INVENTION

This invention relates to valves for fluids and has particular application where the fluids are toxic, radioactive or valuable so that leakage into the environment must be reliably prevented, or where the ingress of ambient atmosphere or other fluid environment must be prevented to avoid reaction or for any other reason.

Known valves of this kind designed to prevent outleakage or inleakage are generally provided with a bellows to seal between the longitudinally movable valve closure member and the stationary body of the valve which carries the valve seat upon which the valve closure member is engaged to close the valve. Such valves are hereinafter referred to as of 'the specified kind.' Should the bellows fail, however, such valves would be subject to leakage.

It is an object of the present invention to provide a valve of the specified kind with additional safeguards as a precaution against bellows failure.

SUMMARY OF THE INVENTION

According to the present invention a valve of the hereinbefore specified kind includes a bellows mounting member to which one end of the valve bellows is sealed, the other end of the bellows being sealed to the valve closure member;

two separate portions of the valve body between which said bellows mounting member is interposed with the provision of sealing means;

a valve operating member secured to the valve closure member and capable of longitudinal movement in a bore in one of the valve body portions;

sealing means effective between said valve operating member and said bore;

and a rotatable member held against longitudinal movement in screwthreaded engagement with the valve operating member over a length thereof at the opposite side of the last-named sealing means from said valve closure member, for moving by rotation of said rotatable member said valve closure member between 'valve open' and 'valve closed' positions.

Preferably, means are provided allowing testing during operation for both inleakage and outleakage. Such means conveniently consists of a valved communication to an interspace between the bellows and the first-named sealing means specified in the foregoing paragraph.

DESCRIPTION OF THE DRAWINGS

A constructional example embodying the invention will now be described with reference to the accompanying drawings, wherein.

DESCRIPTION OF THE PREFERRED EMBODIMENT

Figure 1:
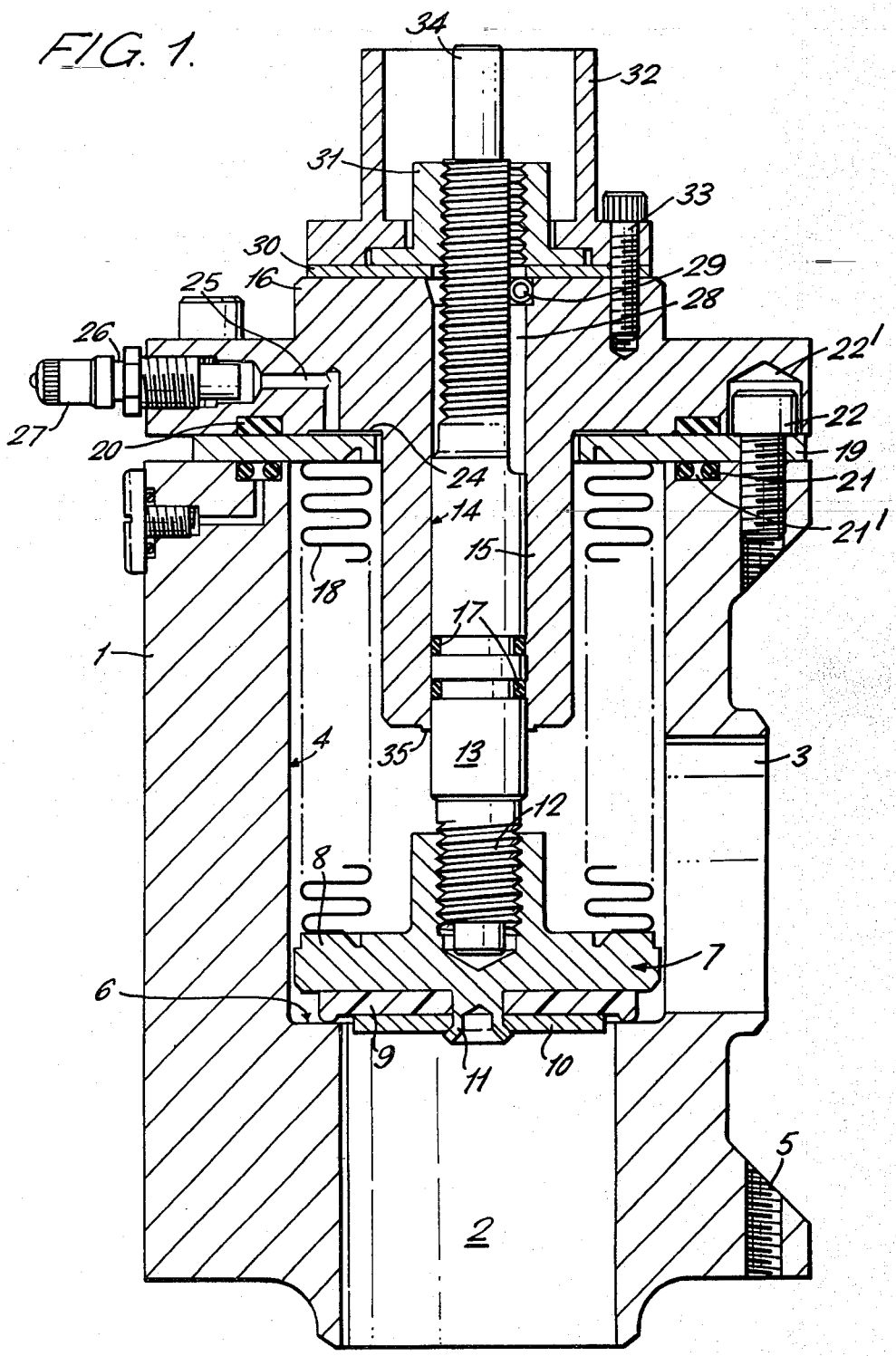
FIG. 1 is a side view, in section on line I—I of FIG. 3, of a stop valve.
Figure 2:
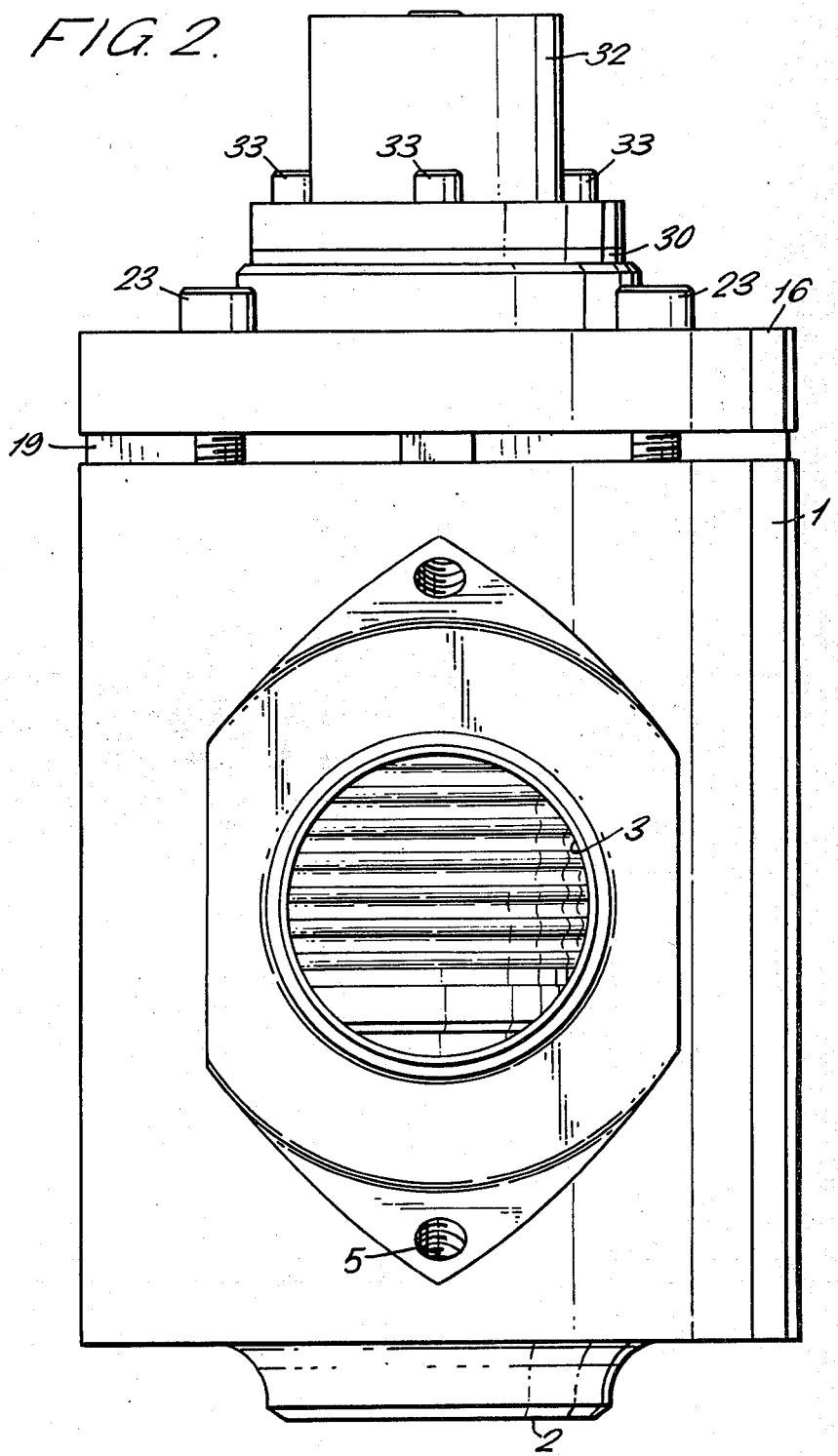
FIG. 2 is an end view.

Referring to the drawings, in the construction shown therein, we provide a valve body portion 1 having an inlet bore 2, an outlet bore 3 at right angles to the bore 2, and a larger bore 4 providing a chamber for the valve internals. Bolt holes 5 are provided in the lower part of the body portion 1 for securing the valve to plant. Expedients (conventional) for securing piping to the inlet and outlet are also provided (not shown).

The chamber provided by bore 4 terminates in a shoulder 6 surrounding inlet bore 2; this provides a valve seat upon which a valve closure member 7 can engage in the closed position of the valve. The closure member 7 consists of a necked disc 8 on the lower side of which is a valve washer 9 (of nylon or polytetrafluoroethylene or similar corrosion-resistant plastic) secured by a valve washer backing disc 10 secured on the disc 8 by a spread ferrule 11 forming part of the disc 8.

Figure 3:
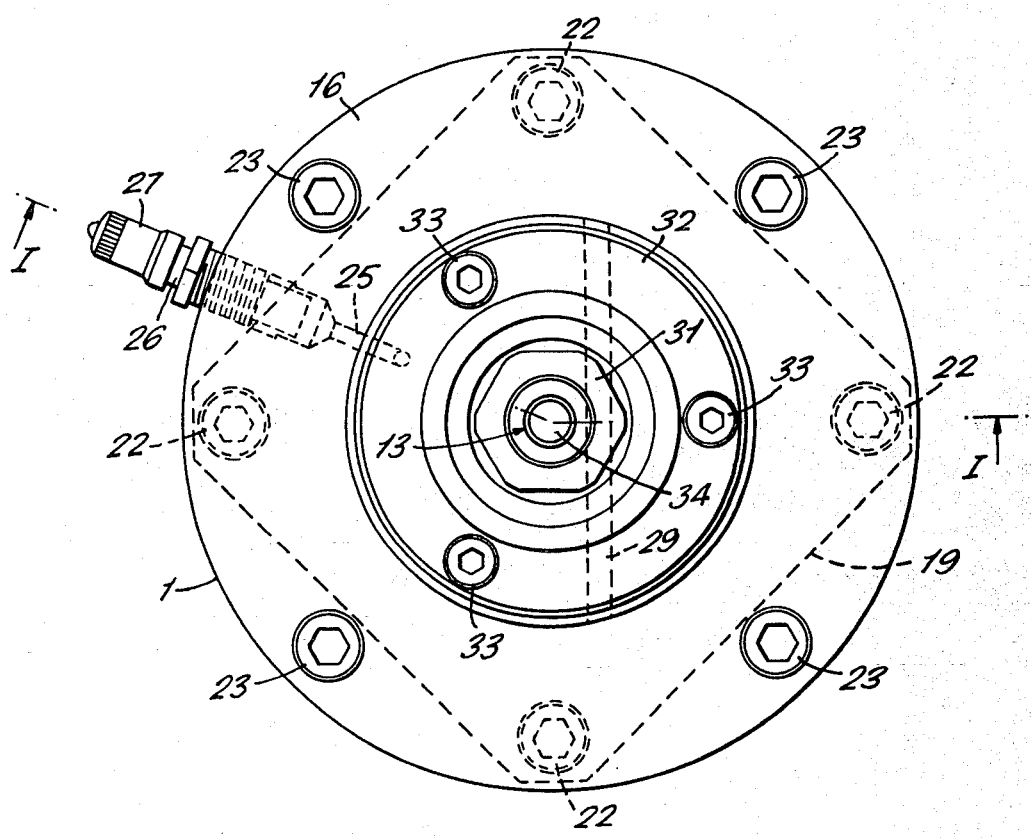
FIG. 3 is a plan view.

The neck of the disc 8 has a blind-ended screwthreaded hole 12 engaged by the screwthreaded end of a generally cylindrical valve operating member 13 carried in a cylindrical bore 14 in a neck 15 of the second valve body portion 16, two 'O' ring seals 17 being provided in corresponding grooves in the member 13. The upper side of the disc 8 has the lower end of metallic bellows 18 sealingly secured to it, the upper end of the bellows 18 being sealingly secured to a generally rectangular bellows mounting member 19 which is interposed between the upper end face of body portion 1 and the lower end face of body portion 16, with the neck 15 of the body portion 16 extending through an aperture in the member 19 and disposed within the bellows 18. A ring seal 20 is provided in a corresponding cavity in the body portion 16 and provides back-up sealing to that provided by the bellows 18. Headed bolts 22 secure the member 19 to the body portion 1, and a seal 21 between the member 19 and the body portion 1, being a primary seal as is bellows 18, is provided by two 'O' rings disposed in a corresponding cavity in the upper end face of body portion 1, an interspace 21' being provided between the 'O' rings and in communication therewith a 'sniffing' hole and external plug (as shown in FIG. 1) for initial testing of the seal 21. The body portion 16 has cavities 22' for the heads of bolts 22, and headed bolts 23 serve for securing the body portion 16 to the body portion 1 outside the periphery of the member 19 (see FIG. 3). An interspace 24 provided by an annular clearance between member 19 and the lower end face of body portion 16, the interspace terminating short of ring seal 20, has communicating with it a 'sniffing' hole 25 terminating on the outside of body portion 16 and provided with a valve 26 and cap 27 by means of which the kind of atmosphere present in the interspace 24 can be 'sniffed' by suitable portable monitoring equipment (not shown), and thus the sealing-effectiveness of bellows 18, seal 20, seal 21 and 'O' rings 17 can be tested.

The valve operating member 13 has its upper end screwthreaded and also has a flat 28 formed longitudinally over slightly more than its screwthreaded length. A spring dowel pin 29 extending transversely across bore 14 of body portion 16 engages the flat 28 and prevents member 13 from rotating whilst allowing longitudinal movement. A washer 30 holds the pin 29 in position, and a valve operating rotatable member 31 is held against longitudinal movement but in screwthreaded engagement with the upper end of member 13 by a flanged sleeve 32 bolted to portion 16 by bolts 33. The member 31 has a nut exterior (see FIG. 3) for engagement by a valve operating tool (not shown) slid over reduced cylindrical upper portion 34 of member 13, which acts as a pivot for the tool.

Instead of manual operating by a tool, an actuator (not shown) can be employed for remote operation. The actuator can either be made integral with body portion 16 or be separate and be secured to body portion 16.

The lower end of neck 15 of body portion 16 has a small annular pip 35 for engagement with the upper end of the neck of disc 8 constituting part of the valve closure member 7. Such engagement is caused when the valve operating member 13 is withdrawn as far as possible by rotation of the member 31, and it serves to provide a further back-up seal for the bellows 18, in addition to its supplementing the 'O' ring seals 17 in the 'open' position of the valve. The other back-up seals are provided by the ring seal 20 and the 'O' ring seals 17. 'O' ring seals 17 and ring seal 20 can be replaced whilst the valve is in service by removing the body portion 16 whilst leaving the mounting member 19 bolted to body portion 1 by the bolts 22.

Valves according to the invention have an application as process gas valves employed in the pipework involved in gas centrifuge cascades for the separation of the $U_{235}$ and $U_{238}$ isotopes of uranium, the process gas employed being uranium hexafluoride.

We claim:

1. A valve for vacuum applications and of the kind which is provided with a bellows for sealing between a longitudinally movable valve closure member and a stationary body of the valve which carries a seat upon which the valve closure member is engaged to close the valve, characterised in that the valve also includes a bellows mounting member to which one end of the valve bellows is sealed, the other end of the bellows being sealed to the valve closure member;

two separate portions of the valve body between which said bellows mounting member is interposed;

first sealing means between said bellows mounting member and said valve body portions, said first sealing means comprising two 'O' ring seals with an interspace between the seals for leak testing, such seals lying between said bellows mounting member and one of said valve body portions and constituting a back-up for helping to retain leak tightness of the valve, and said first sealing means further comprising a ring seal lying beween said bellows mounting member and the other of said valve body portions, with an interspace provided between the bellows and said ring seal for leak testing, said ring seal constituting a back-up for helping to retain leak tightness of the valve in the event the bellows should fail;

a valve operating member secured to the valve closure member and capable of longitudinal movement in a bore in one of the valve body portions;

second sealing means effective between said valve operating member and said bore, said second sealing means comprising a pair of 'O' ring seals mounted in grooves in said valve operating member for contacting said bore;

and a rotatable member held against longitudinal movement in screwthreaded engagement with the valve operating member over a length thereof at the opposite side of the last-named sealing means form said valve closure member, for moving by rotation of said rotatable member said valve closure member between 'valve open' and 'valve closed' positions.

2. A valve according to claim 1, characterised by a sealing surface on that valve body portion which has said bore in it, for sealing engagement with said valve closure member in the 'valve open' position when the valve is fully open, thereby providing an additional back-up to the bellows when the valve is fully open.

* * * * *